(12) United States Patent
Hunt

(10) Patent No.: US 10,387,965 B1
(45) Date of Patent: Aug. 20, 2019

(54) SYSTEMS AND METHODS FOR ALTERNATE LOCATION OF A VEHICLE

(71) Applicant: United Services Automobile Association (USAA), San Antonio, TX (US)

(72) Inventor: James H. Hunt, Valrico, FL (US)

(73) Assignee: United Services Automobile Association (USAA), San Antonio, TX (US)

(*) Notice: Subject to any disclaimer, the term of this patent is extended or adjusted under 35 U.S.C. 154(b) by 492 days.

(21) Appl. No.: 15/079,979

(22) Filed: Mar. 24, 2016

Related U.S. Application Data

(63) Continuation of application No. 12/499,970, filed on Jul. 9, 2009.

(51) Int. Cl.
 *G01S 19/13* (2010.01)
 *G06Q 40/08* (2012.01)

(52) U.S. Cl.
 CPC .............. *G06Q 40/08* (2013.01); *G01S 19/13* (2013.01)

(58) Field of Classification Search
 CPC .............................. G06Q 40/08; G06Q 40/02
 See application file for complete search history.

(56) References Cited

U.S. PATENT DOCUMENTS

2004/0153362 A1* 8/2004 Bauer .................. G06Q 40/02 705/4
2007/0027726 A1* 2/2007 Warren ................ G06Q 40/08 705/4

FOREIGN PATENT DOCUMENTS

JP WO 2005/083605 A1 * 9/2005 .............. G06F 17/60

OTHER PUBLICATIONS

Todd Litman. Distance-Based Vehicle Insurance Feasibility, Costs, and Benefits: Comprehensive Technical Report. Victoria Transport Policy Institute. Jun. 8, 2011. http://www.vtpi.org /dbvi_com.pdf.*

* cited by examiner

*Primary Examiner* — Virpi H Kanervo
(74) *Attorney, Agent, or Firm* — Baker & Hostetler LLP

(57) ABSTRACT

Sensor data related to the vehicle's location is received and then processed to determine whether the primary location of the insured vehicle is within the first rating area. If it is not, then the location data is further processed to determine a second rating area associated with the vehicle's primary location. The risk exposure values for the second rating areas are determined and then used to generate a second set of coverage parameters and a second set of insurance policy price data, which is then used to generate a second premium. The first set of coverage parameters are replaced by the second set of coverage parameters and the first premium is replaced by the second premium.

20 Claims, 6 Drawing Sheets

SYSTEMS AND METHODS FOR ALTERNATE LOCATION OF A VEHICLE

CROSS REFERENCE TO RELATED APPLICATIONS

This application claims priority to, and is a continuation of, U.S. application Ser. No. 12/499,970 filed on Jul. 9, 2009, entitled "System And Methods For Alternate Location Of A Vehicle," which is hereby incorporated by reference in its entirety.

TECHNICAL FIELD

Embodiments of the disclosure relate in general to the field of computers and similar technologies, and in particular to software utilized in this field. Still more particularly, it provides a system, method, and computer-usable medium for managing insurance policy coverage for a vehicle based on its location.

BACKGROUND

Vehicles that are far away from their reported location represent an unknown risk to insurers. For instance, if a car is underwritten based on its primary location being in Florida, but is actually being operated predominantly in Los Angeles, then the risk, and the premium, associated with the vehicle's insurance policy is inaccurate. In today's mobile society, it is not uncommon for such situations to occur. As an example, students routinely drive their vehicles when attending out-of-state colleges. As another example, consultants commonly drive their own vehicles when they are engaged in long-term assignments that are in another city.

However, the risk is not limited to the insurer alone, as not every state in the United States has the same minimum insurance requirements. As a result, it is possible for the owner of a vehicle to be underinsured if the vehicle's primary location is outside its designated rating area. Likewise, some states require a state-specific insurance policy if the vehicle is in the state for more than six months. Acquiring accurate and up to date vehicle location information has traditionally presented challenges to insurers, who typically have relied on policy owners to provide updated information. All too often, this information is acquired when the vehicle's policy is being renewed. More infrequently, vehicle location information is provided voluntarily by the policy owner.

One approach to acquiring information related to a vehicle's primary location is through the use of telematics, which broadly refers to the integrated use of telecommunications and informatics. The use of telematics has more recently been related to the integration of geographical positioning system (GPS) technology with computers and mobile communications technology in automotive navigation systems to monitor the location and movement of a vehicle. Another approach is to use information sources such as a state's Department of Motor Vehicles or a college's enrollment records to provide the basis for determining the location of an associated vehicle. For example, if a college student is listed as the primary driver for a vehicle, and the student is registered at an out-of-state university, or even one with a different ZIP code, then it can be assumed the vehicle is co-located with the student. Based on these information sources, the rating for the vehicle can be properly set. Additionally, a check can be made that the insurance for that vehicle is at or above the minimums for the state in which the vehicle is located. However, vehicle location information provided by telematics or the described information sources is not currently used to automatically verify a vehicle's primary location and associated rating area.

SUMMARY

A system, method, and computer-usable medium are disclosed for managing insurance policy coverage for a vehicle based on its location. In various embodiments, a first insurance policy for a vehicle, comprising a first premium and a first set of coverage parameters corresponding to a first rating area, is generated and issued to a policy owner. Data related to the vehicle's location is received and then processed to determine whether the primary location of the insured vehicle is within the first rating area. If it is not, then the location data is further processed to determine a second rating area associated with the vehicle's primary location. In various embodiments, the location information is provided by a telematics device associated with the insured vehicle. In various other embodiments, the location information is provided by a vehicle operator data provider, such as a state's Department of Motor Vehicles.

The respective risk exposure values for the first rating area and the second rating area are determined and then respectively used to generate a first set of coverage parameters and a second set of coverage parameters. The risk exposure values for the first rating area are then used to generate a first set of insurance policy price data and the risk exposure values for the second rating area are used to generate a second set of insurance policy price data. The second set of insurance policy price data is then used to generate a second premium. If the second rating area requires a separate insurance policy for the vehicle, then a second insurance policy, comprising the second premium and the second set of coverage parameters, is generated and provided to the owner of the first insurance policy. If the owner of the first insurance policy accepts the terms of the second insurance policy, then it is activated. In various embodiments, the second policy is provided, and the first insurance policy owner's acceptance is received, within a user interface implemented on a computing device.

However, if the second rating area does not require a separate insurance policy for the vehicle, then a determination is made whether to replace insurance policy coverage for the first rating area with insurance policy coverage for the second rating area. If so, then the first premium of the first insurance policy is replaced with the second premium and the first set of coverage parameters are replaced with the second set of coverage parameters. Otherwise, the first set of coverage parameters is compared to the second set of coverage parameters to generate a set of coverage parameter differential values, which is then applied to the first set of coverage parameters to generate a third set of coverage parameters. The first set of insurance policy price data is then compared to the second set of insurance policy price data to generate a set of insurance policy price differential data, which is then applied to the first set of insurance policy price differential data to generate a third premium. The first premium of the first insurance policy is then replaced with the third premium and the first set of coverage parameters is replaced with the third set of coverage parameters. The revised first insurance policy is then provided to the owner of the first insurance policy for acceptance. If the owner of the first insurance policy accepts the revisions to the first insurance policy, then the revisions to the first insurance policy are activated. In various embodiments, the revisions to the first policy are provided, and the first insurance policy owner's acceptance is received, within a user interface implemented on a computing device.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION OF ILLUSTRATIVE EMBODIMENTS

Figure 1:
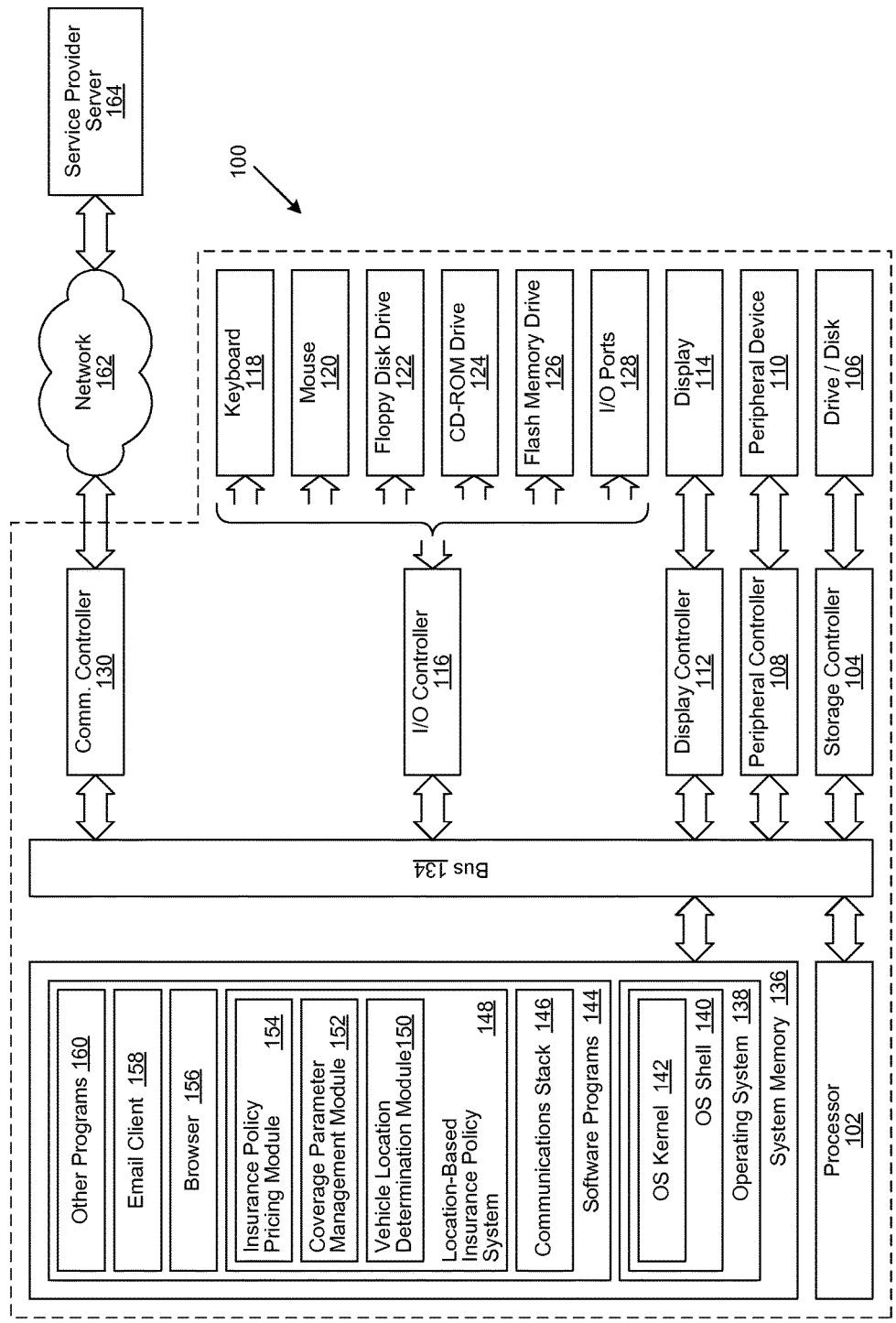
FIG. 1 depicts an exemplary client information processing system (IPS) in which embodiments of the disclosure may be implemented.

A method, system and computer-usable medium are disclosed for managing insurance policy coverage for a vehicle based on its location. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a location-based insurance policy system 148. The location-based insurance policy system 148 includes computer executable instructions for implementing the processes described in FIGS. 2-6 described herein below. In various embodiments, the location-based insurance policy system 148 comprises a vehicle location determination module 150, a coverage parameter management module 152, and an insurance policy pricing module 154. In one embodiment, client IPS 100 is able to download the computer executable instructions of the location-based insurance policy system 148 from a service provider server 164 located at a remote location. In another embodiment, the computer executable instructions of the location-based insurance policy system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
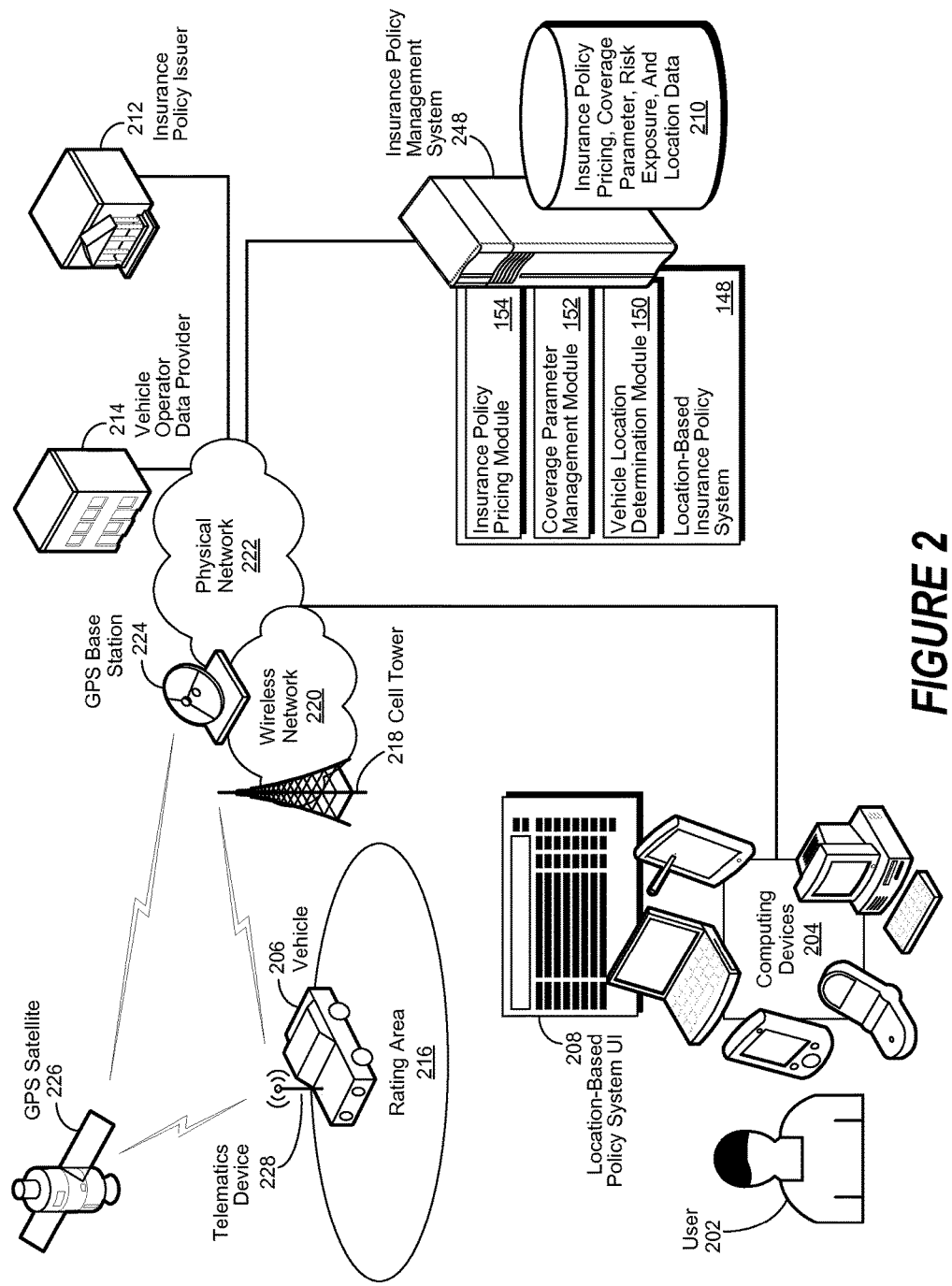
FIG. 2 is a simplified block diagram of a location-based insurance policy system as implemented in accordance with an embodiment of the disclosure.
Figure 3A:
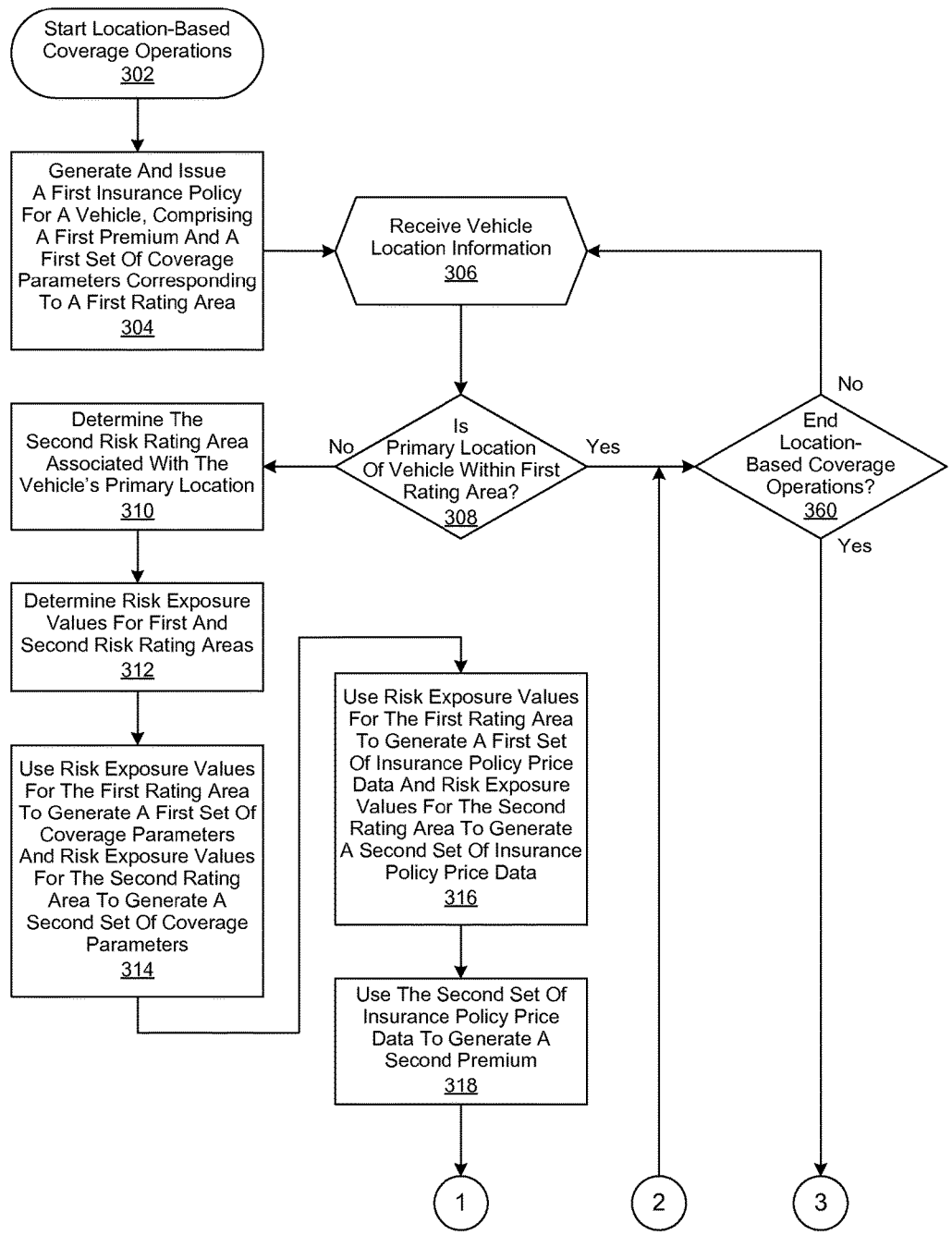
FIGS. 3a-d are a generalized flowchart of the operation of a location-based insurance policy system as implemented in accordance with an embodiment of the disclosure.
Figure 3B:
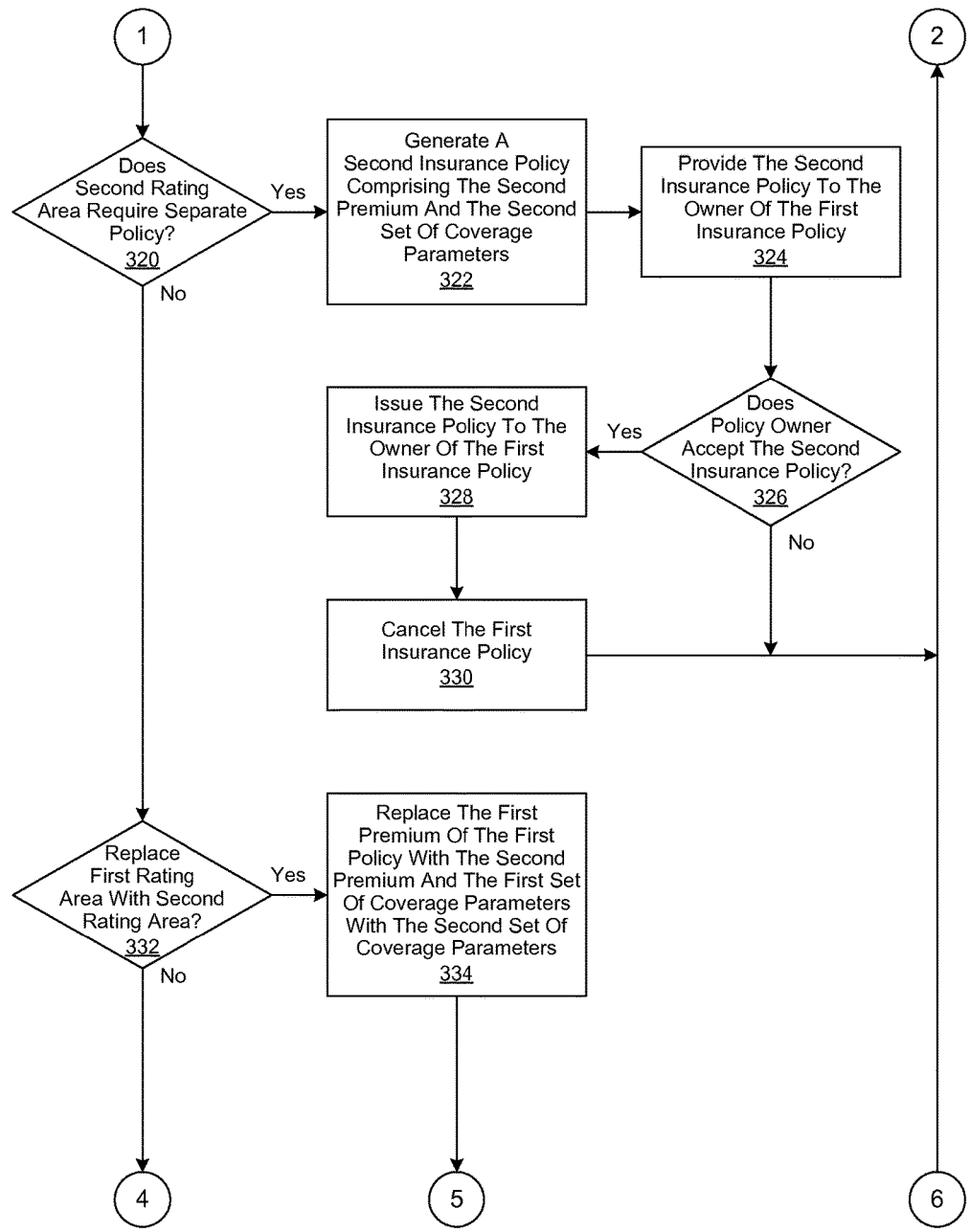
Figure 3C:
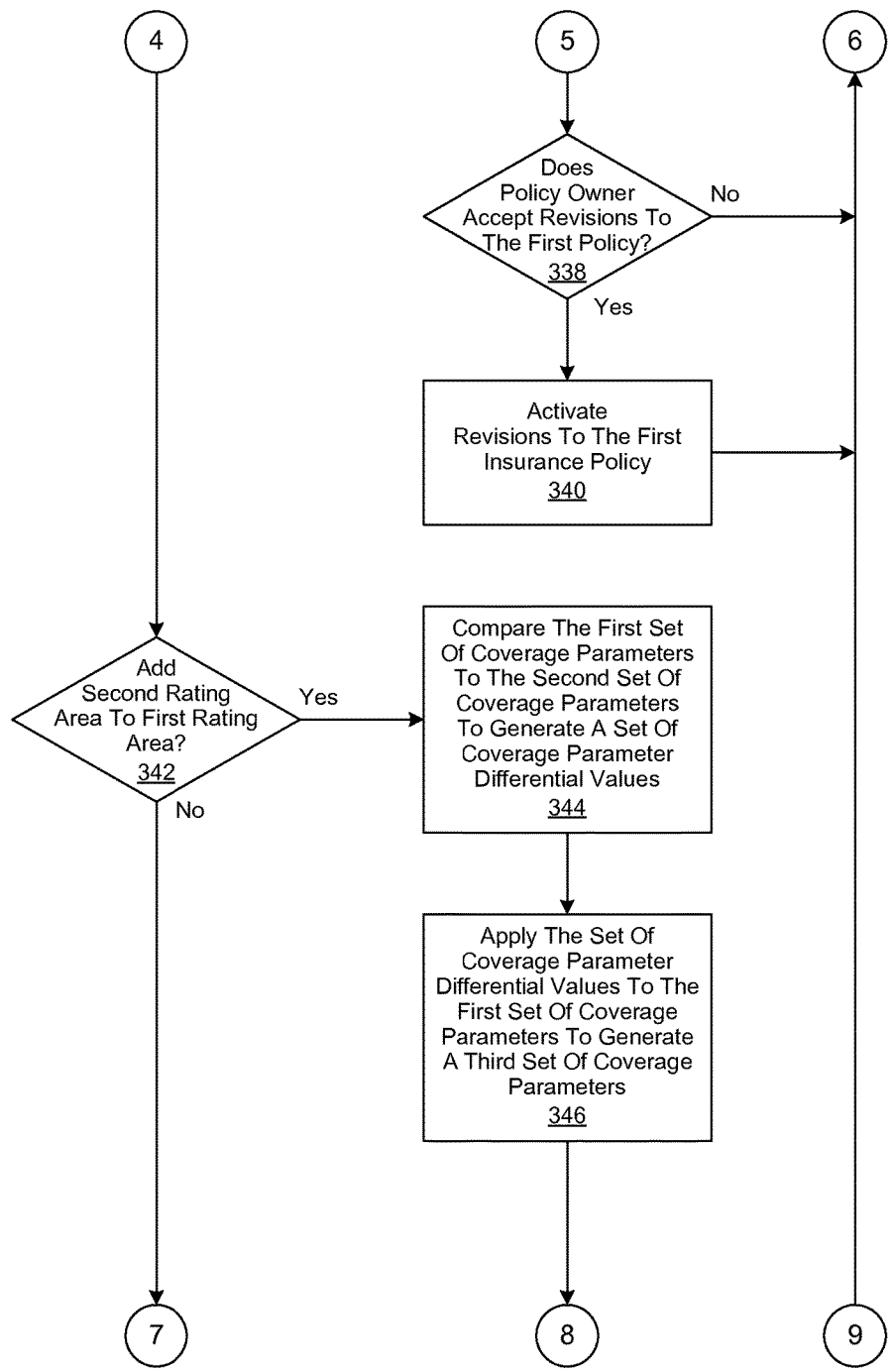
Figure 3D:
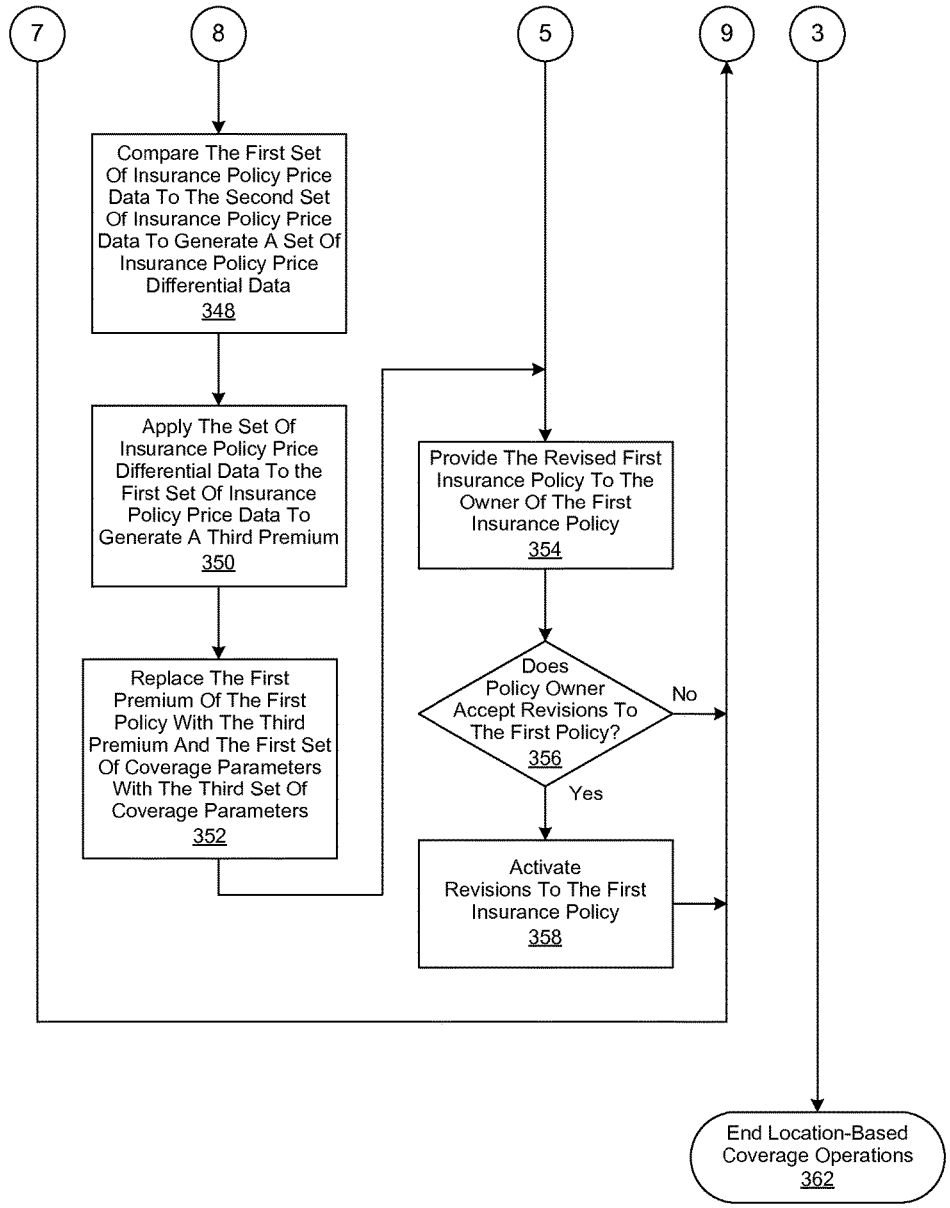

FIG. 2 is a simplified block diagram of a location-based insurance policy system as implemented in accordance with an embodiment of the disclosure. In various embodiments, a location-based insurance policy system 148 is implemented with an insurance policy management system 248 to manage insurance policy coverage for a vehicle 206 based on its location within a rating area 216, 230. In these and other embodiments, the location-based insurance policy system 148 comprises a vehicle location determination module 150, a coverage parameter management module 152, and an insurance policy pricing module 154. Likewise, the insurance policy management system 248 comprises a repository 210 of insurance policy pricing data, coverage parameter pricing data, risk exposure data, and location data.

As used herein, a vehicle 206 refers to any mechanized means of transportation. Examples of such mechanized means of transportation include automobiles, motorcycles, aircraft, and watercraft. It will be appreciated that many such examples of vehicles exist and the foregoing is not intended to limit the spirit, scope, or intent of the disclosure. As likewise used herein, a rating area 216, 230 refers to a vehicle's 206 geographic area of travel. In various embodiments, the rating area 216, 230 may be broadly defined, such as an individual state of the United States, or more narrowly defined, such as the geographical boundaries of a ZIP code. In these and other embodiments, a rating area 216, 230 corresponds to a set of risk exposure values. As used herein, a risk exposure value refers to any qualifiable or quantifiable measure of a risk factor. Examples of such risk factors include the incidence of vehicular accidents, vehicle accident repair costs, and mortality rates. Those of skill in the art will be knowledgeable of many such risk factors and the foregoing is not intended to limit the spirit, scope, or intent of the disclosure.

In this embodiment, a first insurance policy for a vehicle 206, comprising a first premium and a first set of coverage parameters corresponding to a first rating area 216, is generated and issued to a policy owner, such as user 202, by an insurance policy issuer 212. As used herein, coverage parameters refer to insurance policy coverage variables that define an insurer's obligation to pay for damages that are caused by a predetermined peril or group of perils.

Location data related to the vehicle's 206 location is received by the location-based insurance policy system 148 and then processed by the vehicle location determination module 150. In various embodiments, the location information is provided by a telematics device 228 associated with the insured vehicle 206. In these and other embodiments, the telematics device 228 exchanges information in near real-time, or non-real-time, directly or indirectly, through one or more networks 220, 222, with the location-based insurance policy system 148. As used herein, telematics broadly refers to the integrated use of telecommunications and informatics. More specifically, telematics refers to the receiving, storing, processing and sending of information via telecommunication devices, such as the telematics device 228. As likewise used herein, a device used in a telematics system may comprise a laptop computer, a tablet computer, a personal digital assistant (PDA), a mobile telephone, or any device operable to receive, process, store, and transmit information. Likewise, a telematics system device may also comprise a navigation device or a geographic positioning system (GPS), such as embodied in a GPS satellite 226 and a GPS base station 224 attached to a physical network 222 or wireless network 220.

Skilled practitioners of the art will be aware that the use of telematics has more recently been related to the integration of GPS technology with computers and mobile communications technology in automotive navigation systems. When used in such systems, telematics is more commonly referred to as vehicle telematics. One application of vehicle telematics is to monitor the location and movement of a vehicle. This monitoring is commonly achieved through a combination of a GPS receiver and a transmitting device, such as a Global System for Mobile communication (GSM) General Packet Radio Service (GPRS) modem or a Short Message Service (SMS) transmitter. In various embodiments, the location data is provided by the telematics device 228 directly to the location-based insurance system policy system 148 through a wireless connection to a cell tower 218 of the wireless network 220, which is likewise connected to physical network 222. It will be apparent to skilled practitioners of the art that many such embodiments are possible for the receipt, storage, processing, and transmittal of location data by the telematics device 228, and the foregoing is not intended to limit the spirit, scope or intent of the disclosure. In another embodiment, the location information is provided by a vehicle operator data provider 214, such as a state's Department of Motor Vehicles. As another example, the National Student Clearinghouse (www.studentclearinghouse.org) provides enrollment information that can be used to determine the likely location of a student who is an operator of vehicle 206. In yet another embodiment, the location information is provided by the owner of the first insurance policy or an operator of the insured vehicle 206.

The location data is then processed to determine whether the primary location of the insured vehicle 206 is within the first rating area 216. If it is not, then the location data is further processed to determine the second rating area 230 associated with the vehicle's 206 primary location. As used herein, the primary location of a vehicle refers to the vehicle's geographic area of travel that represents the majority of risk to the vehicle and its operator. In one embodiment, the primary location is defined by the amount of time a vehicle is present within a rating area. In another embodiment, the primary location is defined by the number of miles traveled by the vehicle within a rating area. It will be appreciated that many other definitions are possible and the foregoing is not intended to limit the spirit, scope, or intent of the disclosure. The respective risk exposure values for the first rating area 216 and the second rating area 230 are determined and then respectively used to generate a first set of coverage parameters and a second set of coverage parameters. Then the risk exposure values for the first rating area 216 are used to generate a first set of insurance policy price data and the risk exposure values for the second rating area 230 are used to generate a second set of insurance policy price data. The second set of insurance policy price data is then used to generate a second premium.

A determination is then made whether the second rating area 230 requires a separate insurance policy for the vehicle 206. As an example, some states in the United States require an insurance policy issued for the state that is the vehicle's 206 primary location. As another example, the policy owner may wish to have a separate insurance policy for the operator of the vehicle 206, such as a child that is attending college out of state. It will be appreciated that many such examples are possible. If a separate insurance policy is required, then a second insurance policy, comprising the second premium and the second set of coverage parameters, is generated and provided to the owner of the first insurance policy. In various embodiments, the second policy is provided, and the first insurance policy owner's acceptance is received, within a user interface 208 of the location-based insurance policy system implemented on a computing device 204. As used herein, a computing device 204 may comprise a personal computer, a laptop computer, or a tablet computer operable to establish an on-line session with the location-based insurance policy system 148 over a connection to wireless network 220 or physical network 222. The computing device 204 may also comprise a personal digital assistant (PDA), a mobile telephone, or any other suitable device operable to display the location-based insurance policy system UI 208 and likewise operable to establish a connection with wireless network 220 or physical network 222.

However, if it is determined that the second rating area does not require a separate insurance policy for the vehicle 206, then a determination is made whether to replace insurance policy coverage for the first rating area 216 with insurance policy coverage for the second rating area 230. If so, then the first premium of the first insurance policy is replaced with the second premium and the first set of coverage parameters are replaced with the second set of coverage parameters. Otherwise, the first set of coverage parameters is compared to the second set of coverage parameters to generate a set of coverage parameter differential values, which is then applied to the first set of coverage parameters to generate a third set of coverage parameters. As used herein, coverage parameter differential values refer to the differences between a first set of coverage parameters and a second set of coverage parameters. In various embodiments, the comparison of the first and second set of coverage parameters and the generation of coverage parameter differential values is performed by the coverage parameter management module 152. The first set of insurance policy price data is then compared to the second set of insurance policy price data to generate a set of insurance policy price differential data, which is then applied to the first set of insurance policy price differential data to generate a third premium. As used herein, insurance policy price differential data refers to the differences between a first set of insurance policy price data and a second set of insurance policy price data. The first premium of the first insurance policy is then replaced with the third premium and the first set of coverage parameters is replaced with the third set of coverage parameters. In various embodiments, the comparison of the first and second set of insurance policy price data and the generation of insurance policy price differential data is performed by the insurance policy pricing module 154. The revised first insurance policy is then provided to the owner of the first insurance policy for acceptance. If the owner of the first insurance policy accepts the revisions to the first insurance policy then the revisions to the first insurance policy are activated. In various embodiments, the revisions to the first insurance policy are provided, and the first insurance policy owner's acceptance is received, within a user interface 208 of the location-based insurance policy system implemented on a computing device 204 as described in greater detail herein.

FIGS. 3a-d are a generalized flowchart of the operation of a location-based insurance policy system as implemented in accordance with an embodiment of the disclosure. In this embodiment, location-based insurance policy coverage operations for a vehicle are begun in block 302. A first insurance policy for a vehicle, comprising a first premium and a first set of coverage parameters corresponding to a first rating area, are generated and issued to a policy owner in block 304. Vehicle location information is then received in block 306. In one embodiment, and as described in greater detail herein, the location information is provided by a telematics device associated with the insured vehicle. In another embodiment, and as likewise described in greater detail herein, the location information is provided by a provider of vehicle operator information. In yet another embodiment, the location information is provided by the owner of the first insurance policy or an operator of the insured vehicle.

A determination is then made in block 308 whether the primary location of the insured vehicle is within the first rating area. If so, then a determination is made in block 360 whether to end location-based insurance policy coverage operations for the vehicle. If so, then they are ended in block 362. Otherwise, the process is continued, proceeding with block 306. However, if it is determined in block 308 that the primary location of the vehicle is not within the first rating area, then the second rating area associated with the vehicle's primary location is determined in block 310. The respective risk exposure values for the first and second rating areas are then determined in block 312. Then, in block 314, the risk exposure values for the first rating area are used to generate a first set of coverage parameters and the risk exposure values for the second rating area are used to generate a second set of coverage parameters. Then, in block 316, the risk exposure values for the first rating area are used to generate a first set of insurance policy price data and the risk exposure values for the second rating area are used to generate a second set of insurance policy price data. The second set of insurance policy price data is then used in block 318 to generate a second premium.

A determination is then made in block 320 whether the second rating area requires a separate insurance policy for the vehicle. As an example, some states in the United States require an insurance policy issued for the state that is the vehicle's primary location. As another example, the policy owner may wish to have a separate insurance policy for the operator of the vehicle, such as a child that is attending college out of state. It will be appreciated that many such examples are possible. If it is determined in block 320 that a separate insurance policy is required, then a second insurance policy, comprising the second premium and the second set of coverage parameters, is generated in block 322 and provided to the owner of the first insurance policy in block 324. A determination is then made in block 326 whether the owner of the first insurance policy accepts the second insurance policy. If not, the process is continued, proceeding with block 360. Otherwise, the second insurance policy is issued in block 328 to the owner of the first insurance policy and the first insurance policy is cancelled in block 330. In various embodiments, the second policy is provided, and the first insurance policy owner's acceptance is received, within a user interface of the location-based insurance policy system implemented on a computing device as described in greater detail herein. The process is then continued, proceeding with block 360.

However, if it is determined in block 320 that the second rating area does not require a separate insurance policy for the vehicle, then a determination is made in block 332 whether to replace the first rating area with the second rating area. If so, then the first premium of the first insurance policy is replaced with the second premium and the first set of coverage parameters are replaced with the second set of coverage parameters in block 334. The revised first insurance policy is then provided to the owner of the first insurance policy in block 354. A determination is then made in block 356 whether the owner of the first insurance policy accepts the revisions to the first insurance policy. If not, the process is continued, proceeding with block 360. Otherwise, the revisions to the first insurance policy are activated in block 358. In various embodiments, the revisions to the first insurance policy are provided, and the first insurance policy owner's acceptance is received, within a user interface of the location-based insurance policy system implemented on a computing device as described in greater detail herein. The process is then continued, proceeding with block 360.

However, if it is determined in block 320 to not replace the first rating area with the second rating area, then a determination is made in block 342 whether to add the second rating area to the first rating area. If so, then the first set of coverage parameters is compared to the second set of coverage parameters to generate a set of coverage parameter differential values in block 344. The set of coverage parameter differential values is then applied to the first set of coverage parameters in block 346 to generate a third set of coverage parameters. The first set of insurance policy price data is then compared to the second set of insurance policy price data to generate a set of insurance policy price differential data in block 350. The set of insurance policy price differential data is then applied to the first set of insurance policy price differential data in block 346 to generate a third premium. In block 352, the first premium of the first insurance policy is replaced with the third premium and the first set of coverage parameters is replaced with the third set of coverage parameters. The process is then continued, proceeding with block 354 as described in greater detail hereinabove.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed:

1. A system comprising:
   a processor; and
   a non-transitory computer-readable storage medium storing instructions that cause the processor to effectuate operations, the operations comprising:
   receiving geographic location data indicative of one or more locations of a vehicle from a sensor associated with the vehicle, wherein the geographic location data includes a number of miles traveled in each of a plurality of rating areas;
   determining a first rating area among the plurality of rating areas covering a geographic area of travel associated with the vehicle, wherein the geographic location data includes a first number of miles traveled within the first rating area;
   generating a first insurance policy for the vehicle based on at least the first rating area, the first insurance policy having a first premium and a first set of coverage parameters;
   determining a second rating area among the plurality of rating areas covering the geographic area of travel associated with the vehicle, wherein the second rating area is different than the first rating area, and wherein the geographic location data includes a second number of miles traveled within the second rating area;
   generating a second insurance policy for the vehicle based on at least the second rating area, the second insurance policy having a second premium and a second set of coverage parameters;
   comparing the first set of coverage parameters to the second set of coverage parameters;
   generating a set of coverage parameter differential values based on the comparison;
   generating a third set of coverage parameters based on the set of coverage parameter differential values;
   determining a primary location within the plurality of rating areas, wherein the primary location is based on the geographic area of travel where a predominant number of miles among the first number of miles and the second number of miles were traveled;
   generating a revised insurance policy for the vehicle based on the third set of coverage parameters, wherein the third set of coverage parameters modifies one of the first set of coverage parameters and the second set of coverage parameters, and wherein a premium of the revised insurance policy is based on the modified set of coverage parameters; and
   providing the revised insurance policy for the vehicle to a customer.

2. The system of claim 1, wherein the geographic location data comprises telematics data.

3. The system of claim 1, wherein determining the primary location is further based on the vehicle located within the primary location for a threshold period of time.

4. The system of claim 1, wherein at least a portion of the geographic location data is received from a vehicle operator data provider.

5. The system of claim 1, wherein the operations further comprise:

comparing the first premium to the second premium;
generating a set of insurance policy price differential data based on the comparison; and
generating a third premium based on the set of insurance policy price differential data, wherein the first insurance policy is modified based on the third premium.

6. The system of claim 1, wherein at least one of the first set of coverage parameters and the second set of coverage parameters relate to a mortality rate respectively in the first rating area or the second rating area.

7. The system of claim 1, wherein at least one of the first set of coverage parameters and the second set of coverage parameters relate to accident repair costs respectively in the first rating area or the second rating area.

8. A method comprising:
receiving, by a processor, geographic location data indicative of one or more locations of a vehicle from a sensor associated with the vehicle, wherein the geographic location data includes a number of miles traveled in each of a plurality of rating areas;
determining, by the processor, a first rating area among the plurality of rating areas covering a geographic area of travel associated with the vehicle, wherein the geographic location data includes a first number of miles traveled within the first rating area;
generating, by the processor, a first insurance policy for the vehicle based on at least the first rating area, the first insurance policy having a first premium and a first set of coverage parameters;
determining, by the processor, a second rating area among the plurality of rating areas covering the geographic area of travel associated with the vehicle, wherein the second rating area is different than the first rating area, and wherein the geographic location data includes a second number of miles traveled within the second rating area;
generating, by the processor, a second insurance policy for the vehicle based on at least the second rating area, the second insurance policy having a second premium and a second set of coverage parameters;
comparing, by the processor, the first set of coverage parameters to the second set of coverage parameters;
generating, by the processor, a set of coverage parameter differential values based on the comparison;
generating, by the processor, a third set of coverage parameters based on the set of coverage parameter differential values;
determining, by the processor, a primary location within the plurality of rating areas, wherein the primary location is based on the geographic area of travel where a predominant number of miles among the first number of miles and the second number of miles were traveled;
generating, by the processor, a revised insurance policy for the vehicle based on the third set of coverage parameters, wherein the third set of coverage parameters modifies one of the first set of coverage parameters and the second set of coverage parameters, and wherein a premium of the revised insurance policy is based on the modified set of coverage parameters; and
providing, by the processor, the revised insurance policy for the vehicle to a customer.

9. The method of claim 8, wherein determining the primary location is further based on the vehicle located within the primary location for a threshold period of time.

10. The method of claim 8, wherein the sensor comprises global positioning system (GPS) technology.

11. The method of claim 8, wherein the sensor comprises a mobile device.

12. The method of claim 8, wherein at least a portion of the geographic location data is received from a vehicle operator data provider.

13. The method of claim 8, further comprising:
wherein at least one of the first set of coverage parameters and the second set of coverage parameters relate to accident repair costs respectively in the first rating area or the second rating area.

14. The method of claim 8, wherein at least one of the first set of coverage parameters and the second set of coverage parameters relate to a mortality rate respectively in the first rating area or the second rating area.

15. A non-transitory computer-readable storage medium storing instructions that cause a processor executing the instructions to effectuate operations, the operations comprising:
receiving geographic location data indicative of one or more locations of a vehicle from a sensor associated with the vehicle, wherein the geographic location data includes a number of miles traveled in each of a plurality of rating areas;
determining a first rating area among the plurality of rating areas covering a geographic area of travel associated with the vehicle, wherein the geographic location data includes a first number of miles traveled within the first rating area;
generating a first insurance policy for the vehicle based on at least the first rating area, the first insurance policy having a first premium and a first set of coverage parameters;
determining a second rating area among the plurality of rating areas covering the geographic area of travel associated with the vehicle, wherein the second rating area is different than the first rating area, and wherein the geographic location data includes a second number of miles traveled within the second rating area;
generating a second insurance policy for the vehicle based on at least the second rating area, the second insurance policy having a second premium and a second set of coverage parameters;
comparing the first set of coverage parameters to the second set of coverage parameters;
generating a set of coverage parameter differential values based on the comparison;
generating a third set of coverage parameters based on the set of coverage parameter differential values;
determining a primary location within the plurality of rating areas, wherein the primary location is based on the geographic area where a predominant number of miles among the first number of miles and the second number of miles were traveled;
generating a revised insurance policy for the vehicle based on the third set of coverage parameters, wherein the third set of coverage parameters modifies one of the first set of coverage parameters and the second set of coverage parameters, and wherein a premium of the revised insurance policy is based on the modified set of coverage parameters; and
providing the revised insurance policy for the vehicle to a customer.

16. The non-transitory computer-readable storage medium of claim 15, wherein the geographic location data comprises telematics data.

17. The non-transitory computer-readable storage medium of claim 15, wherein determining the primary location is further based on the vehicle located within the primary location for a threshold period of time.

18. The non-transitory computer-readable storage medium of claim 15, wherein at least a portion of the geographic location data is received from a vehicle operator data provider.

19. The non-transitory computer-readable storage medium of claim 15, wherein the operations further comprise:
   wherein at least one of the first set of coverage parameters and the second set of coverage parameters relate to an incidence of vehicular accidents respectively in the first rating area or the second rating area.

20. The non-transitory computer-readable storage medium of claim 15, wherein at least one of the first set of coverage parameters and the second set of coverage parameters relate to a mortality rate respectively in the first rating area or the second rating area.

* * * * *